Figure 1:
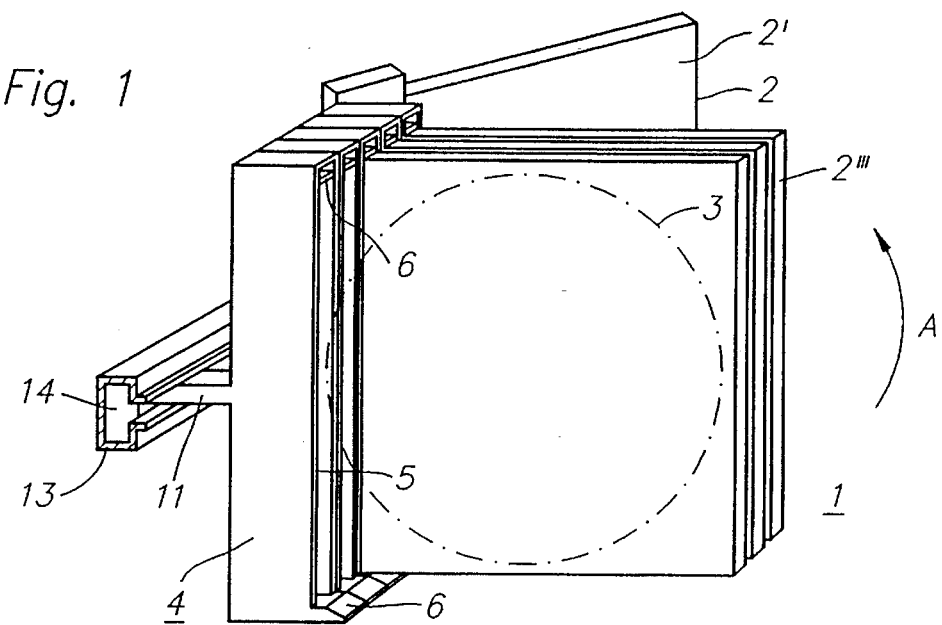

United States Patent [19]
Bearth

[11] Patent Number: 5,495,953
[45] Date of Patent: Mar. 5, 1996

[54] DEVICE FOR STORING COMPACT DISCS AND THE LIKE

[76] Inventor: Urs Bearth, Zeunerstrasse 7, CH-8037 Zürich, Switzerland

[21] Appl. No.: 206,936

[22] Filed: Mar. 7, 1994

[30] Foreign Application Priority Data

Mar. 8, 1993 [CH] Switzerland .......................... 00684/93

[51] Int. Cl.⁶ .................................................. A47G 29/00
[52] U.S. Cl. .................................. 211/40; 211/94; 211/96; 211/168
[58] Field of Search ................................ 211/40, 94, 96, 211/168

[56] References Cited

U.S. PATENT DOCUMENTS

| | | | |
|---|---|---|---|
| 1,421,391 | 7/1922 | Bower | 211/40 |
| 3,017,999 | 1/1962 | Cano | 211/40 |
| 3,502,222 | 3/1970 | Crafoord | 211/40 |
| 4,584,950 | 4/1986 | Adams et al. | 211/43 X |
| 5,080,231 | 1/1992 | Price, Jr. et al. | 211/40 X |
| 5,160,050 | 11/1992 | Russo | 11/40 |
| 5,344,028 | 9/1994 | Angele | 211/40 |
| 5,370,244 | 12/1994 | Peng | 211/40 |

*Primary Examiner*—Leslie A. Braun
*Assistant Examiner*—Gwendolyn Wrenn
*Attorney, Agent, or Firm*—Browdy and Neimark

[57] ABSTRACT

A storage device (1) for compact discs (3) which are placed in acrylic glass-like, file-box-shaped cases (2) is described. Here, these cases (2) can be inserted into holder elements (4) consisting of a frame (5) and an interior inserting device (6), and the holder elements (4) themselves can be displaced via pivot journals (11) in the hollow chamber (14) of a stationary T-shaped profiled section (13).

8 Claims, 2 Drawing Sheets

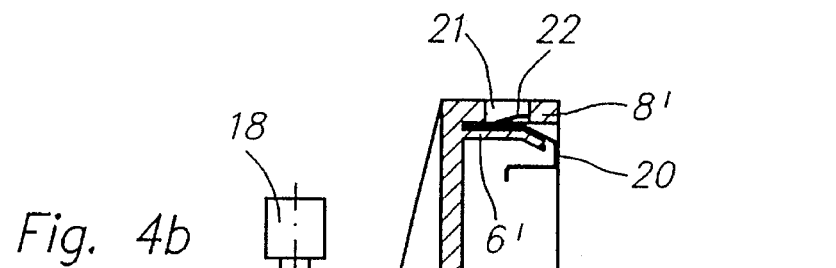
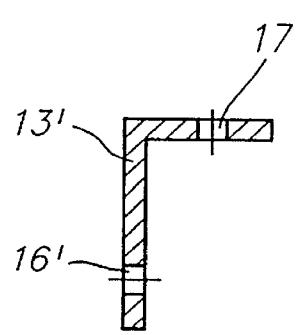
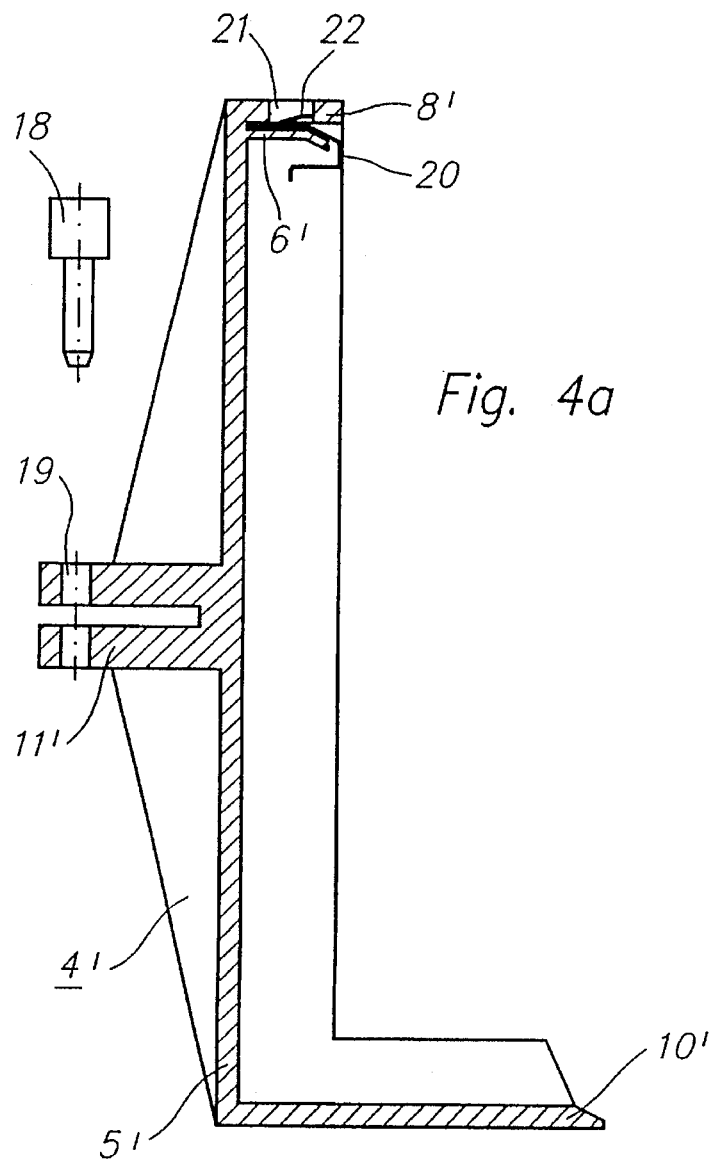
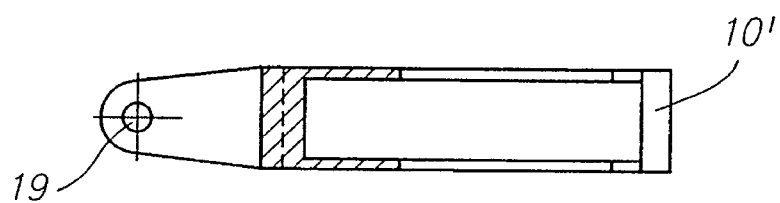

DEVICE FOR STORING COMPACT DISCS AND THE LIKE

As a rule, compact discs are placed into illustrated acrylic glass-like cases, on the one hand to protect the actual sound recording medium, the discs, against damage during transport and in storage and, on the other hand, to give the user rapidly and simply some information regarding the recorded material by means of conspicuous illustrations.

The illustrations and possibly also listings of the individual recorded titles, the performers and information regarding the length of the individual recordings in the information of the said cases are mainly restricted to the respective base and cover surfaces of the cases. General information regarding the recorded pieces or the production numbers of the manufacturer may be found on the respective narrow lateral surfaces.

Devices are known in which tower-like holders of metal, wood or plastic have recesses into which the compact discs together with their cases can be inserted horizontally at a distance from each other in a drawer-like manner, so that a defined number of discs can be stacked in such devices. The disadvantage in connection with such devices lies in that the stability of such tower-like metal holders depends on the support on the bottom surface. There is therefore no assurance that such a metal holder cannot be tipped over willfully or accidentally by small children, or such assurance can only be provided if floor supports of uncommonly large proportions are chosen, which are not desirable from a design point of view. Furthermore, another disadvantage of such a storage system lies in that only the narrow lateral surfaces of the cases of the compact discs are accessible to the user. Only when some of the compact discs have been removed from the recesses does the base or top surface of one or the other disc become visible. In addition, scratching of the cases cannot be prevented, particularly with metal holders. The fact that a comparatively large amount of space is required for storing large numbers of discs is not insignificant.

Storage systems are also known wherein the compact discs are taken out of their actual cases (Swiss Patent CH-PS 678 370) and can be inserted into plastic pockets in the manner of a coupon filing system. Although the individual pocket-like spaces with the discs inserted can be turned like pages, so that the fronts and backs of the discs can be viewed and information regarding their contents can be obtained, the actual manipulation as file folders however is cumbersome and prevents the access to a plurality of compact discs. An additional disadvantage of such systems is that the very illustrative cases which are provided as packaging for the compact discs become superfluous.

Also known are so-called rack or placement systems, wherein the cases for the compact discs can be stored on one of their narrow lateral surfaces (mostly the back surface) in very precisely made tracks. The distance of the lateral surfaces defining the base of the tracks is selected to be such that the compact disc cases can be tilted forward and back without falling over, and that they are fixed in the rack in their position when tilted forward or back, i.e. they cannot be removed. With such systems the cases of the compact discs can only be removed from the storage device in the vertical position. Such systems are also hard to fix in a stable position, so that when manipulated carelessly, individual compact disc cases jump out of the tracks and thus make the storage system questionable, because the cases are not guided and gripped at least at a single narrow lateral surface.

In another known system (Deja-Accessoires, Germany), the rear lateral surfaces (back surface) of the compact disc cases, which are embodied in a hinge-like manner, are grasped in guides made of plastic, which are inclined towards the back from the bottom to the top in this storage system, so that the stored compact discs rest on their rear lateral surface and in this way gravity acts against the unwanted dropping of the compact discs out of the storage system.

The holders of this system are rotatably seated by means of pivot bolts in such a way that it becomes possible to leaf through a multitude of inserted compact disc cases in order to obtain information regarding the recorded contents of the discs by means of the illustrations on the base and cover sides of the cases of the compact discs. The disadvantage of this system lies in the not very stable guidance of the rear lateral surface which results in the cases sliding out of the guides when being jarred, so that they must be rearranged.

In addition, with these systems a relatively large amount of space is required in view of the number of compact discs to be stored, and the set structural shape allows little flexibility in regard to the arrangement because of the fixed space conditions.

It is therefore the object of the present invention to remove the previously mentioned disadvantages of the various devices and to provide a device for the storage and/or holding of compact discs in their cases which entails a simple and stable and as child-proof a storage as possible, in addition allows an optimal viewing possibility of the covers of the cases of the compact discs and besides strives for a very compact construction. It is furthermore intended to achieve a possibility for unlimited expansion and to provide an optimal adaptation to individually fixed space conditions.

The device which meets this object is defined by the characterizing features of claim 1.

Figure 2:
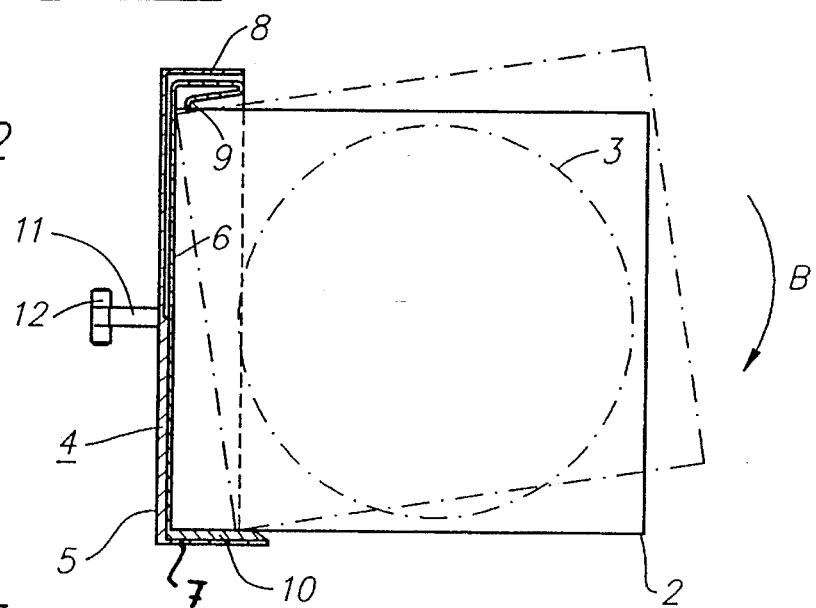
Figure 3:
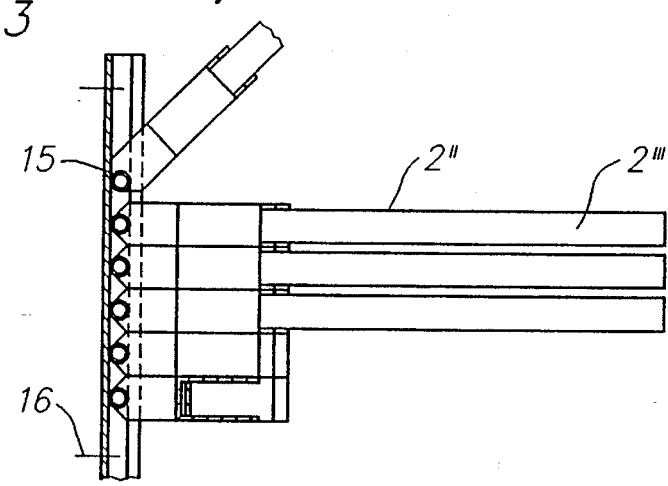

The invention will be described in detail below by means of two exemplary embodiments illustrated in the drawings. Shown are in:

FIG. 1, a perspective view of a first storage device with some compact discs inserted in their cases, FIG. 2, a vertical section through this first storage device and an appropriate holder element, FIG. 3, a top view, partially in section, of the first storage device, FIG. 4a, a sectional view of a further exemplary embodiment of a second storage device, FIG. 4b, a holder element for fastening the storage device on a guide device, FIG. 4c, a guide device for holding a storage device in accordance with FIG. 4a, FIG. 4d, a top view partially in section, of the second storage device.

A first storage device 1 with compact discs 3 partially placed in cases 2 is shown in a perspective view in FIG. 1. The file-box-like cases 2 enclose the compact discs 3 stored in them and have respectively a cover surface 2', a bottom or base surface 2" and lateral surfaces 2'''. Colored illustrations and information regarding the actual compact disc, such a title, performers, length of the recording, etc. are customarily placed on the cover surface 2' and the bottom or base surface 2".

These file-box-like cases 2 are inserted into holder elements 4 with the rear lateral surface 2''' (or with the front lateral surface 2'''), which customarily contains a hinge by means of which the case can be opened to remove the actual compact disc 3. These holder elements 4 consist of an exterior box-shaped frame 5 and an interior inserting device 6. The interior inserting device 6 consists of a U-shaped profiled section, which is fixedly connected with the bottom 7 of the exterior box-shaped frame 5 and with the lower part of the box-shaped frame 5 which constitutes the back wall surface of the holder element. However, the upper part of the U-shaped profiled section is guided at a distance from the box-shaped frame 5 constituting the back wall surface of the holder element, so that a deflection of the U-shaped profiled section against the rear wall surface is possible.

The cover surface 8 of the box-shaped frame 5 also extends at a distance from the roof-shaped part 9 of the U-shaped profiled section, which is resiliently supported in the position of rest on the upper lateral surface 2'''. This roof-shaped part 9 preferably has a meander-shaped bend on its outer end (see FIG. 2 in this connection), on which the upper lateral surface of the case is resiliently supported.

In the present exemplary embodiment the part of the U-shaped profiled section forming the bottom 10 of the interior inserting device 6 is connected in a molded part with the bottom 7 of the exterior box-shaped frame 5 and is injection-molded from plastic.

Furthermore, the compact disc case 2 inserted into the holder element 5 which is farthest back is turned in the direction of the arrow A to indicate that "leafing through" the individual compact disc cases 2 is possible when the compact disc cases 2 are inserted into the holder elements 5.

The pivot movement is performed via a pivot journal 11 comprising a cylinder-shaped bolt 12 and connected with the holder elements 5.

In the process the pivot journal 11 engages a T-shaped hollow profiled section 13, in the actual hollow chamber 14 of which the bolt 12 is disposed vertically in such a way that the holder elements 4 can be pivoted or displaced in the longitudinal direction in the hollow profiled section 13.

A vertical section through a device or through a corresponding holder element 4 is illustrated in FIG. 2. It contains a functional illustration in dashed lines how the case 2 of a compact disc 3 can be inserted into the holder elements 4. It is inserted into the holder elements in an angled position, lifted on the side 2''' which is removed from the holder element 4, and is brought into the resting position by turning in the direction of the arrow B. In the course of this the roof-shaped, meander-shaped formed part 9 of the interior inserting device 6 which is resiliently supported on the upper lateral edge 2''' of the case 2 is deflected in the direction of the frame 5 forming the back wall or against its cover surface 8.

In the position of rest, i.e. with the case 2 with the respective compact disc 3 inserted into the holder element 4, the roof-shaped, meander-shaped formed part of the U-shaped profiled section of the interior inserting device 6 is slightly supported on the lateral surface 2''' of the case 2. By means of this it is prevented that the holding position is loosened in case of jarring. The case 2 can also not be removed from the holder element 4 by pulling from below, which constitutes a certain amount of child-proofing.

It can be clearly seen in a top view of the storage device in FIG. 3 how, when the holder elements are turned, they can be turned against stops of the pivot journals 11 in order to prevent the pivot journals from being turned too far. In addition, fastening holes 16 in the hollow profiled section 13 are indicated by appropriate center lines, via which the entire storage device can be fastened on pieces of furniture or stationary walls.

A further exemplary embodiment of the storage device is illustrated in FIGS. 4a, 4b, 4c and 4d. (For the sake of clarity, the same reference numerals, but provided with a prime, are used for units which are functionally the same).

In this exemplary embodiment, the actual holder element 4' (see FIG. 4a) is embodied as a single part. Thus the division into the frame 5 constituting the back wall of the holder element and the interior inserting device 6 are omitted. In their place a clamping shoe 6' is formed on the upper, roof-shaped part 8' of the holder element 4', into which a steel spring 20 can be inserted, the barb 22 of which can be snapped into a slit 21 provided for this.

Such holder elements 4' have a support bore 19 in their pivot journal 11', into which an angled profiled section 13' (see FIG. 4c) can be inserted and pivotably seated via an appropriate holding tang 18 (see FIG. 4b).

Because the bottom parts 10' of the holder elements 4' project considerably past the U-box shaped extension of the frame 5', the insertion assurance of a compact disc case 2 to be stored can be considerably increased, because such a case then rests on the bottom part and can be inserted, slightly pivoted, into the holder element.

In this way such a holder element has a shape which can be cheaply injection-molded from plastic and can be fashioned by means of commercially available steel springs into very effectively employable holder elements.

Furthermore, the angled profiled sections 13' can be fastened via bores 16' on walls or cabinet surfaces and in this way permit a principally stationary arrangement of an arbitrary number of such holder elements which, if needed, can also be easily disassembled.

All previously mentioned steps thus contribute to the provision of a compact and stable storage device for compacts discs which can be stacked so they can be clearly seen.

I claim:

1. A device for storing and holding compact discs (3) in cases (2) each having a respective hinge area, comprising:

at least one vertically arranged holder element (4,4') for grasping selectively the hinge area or an opposite side of one of the cases (2);

means, in an upper area of the holder element (4,4'), for permitting a lateral surface (2''') of the case (2) to be supported at least partly resiliently on a roof-shaped part (9) of an interior of the holder element (4,4');

wherein the holder element (4) includes an interior U-shaped inserting device (6) and an exterior box-shaped frame (5) enclosing it, and wherein the interior inserting device (6) and the exterior box-shaped frame (5) are fixedly connected with each other in a lower area of the holder elements (4), and wherein the interior inserting device (6) is a predetermined distance from the exterior box-shaped frame (5) in the upper area of the holder element (4) and can be supported in a meander-shaped manner on the lateral surface (2''') of the case (2) of the compact discs (3) in the roof-shaped area (9); and wherein the holder elements (4) are provided with a pivot journal (11) which can be longitudinally displaced in a vertically disposed guide (13).

2. The device in accordance with claim 1, wherein the guide (13) consists of a halved T-shaped hollow profiled section (14) and the pivot journal (11) is provided with stop means (15).

3. The device in accordance with claim 1, including a guide (13), the guide including means for stationary fastening (16).

4. A device for storing and holding compact discs (3) in cases (2) each having a respective hinge area, comprising:

at least one vertically arranged holder element (4,4') for grasping selectively the hinge area or an opposite side of one of the cases (2);

means, in an upper area of the holder element (4,4'), for permitting a lateral surface (2''') of the case (2) to be supported at least partly resiliently on a roof-shaped part (9) of an interior of the holder element (4,4');

wherein the holder element (4) includes an interior U-shaped inserting device (6) and an exterior box-shaped frame (5) enclosing it, and wherein the interior inserting device (6) and the exterior box-shaped frame (5) are fixedly connected with each other in a lower area of the holder elements (4), and wherein the interior inserting device (6) is a predetermined distance from the exterior box-shaped frame (5) in the upper area of the holder element (4) and can be supported in a meander-shaped manner on the lateral surface (2''') of the case (2) of the compact discs (3) in the roof-shaped area (9); and including a guide (13), the guide including means for stationary fastening (16).

5. A device for storing and holding compact discs (3) in cases (2) each having a respective hinge area, comprising:

at least one vertically arranged holder element (4,4') for grasping selectively the hinge area or an opposite side of one of the cases (2);

means, in an upper area of the holder element (4,4'), for permitting a lateral surface (2''') of the case (2) to be supported at least partly resiliently on a roof-shaped part (9) of an interior of the holder element (4,4');

wherein the holder element (4) includes an interior U-shaped inserting device (6) and an exterior box-shaped frame (5) enclosing it, and wherein the interior inserting device (6) and the exterior box-shaped frame (5) are fixedly connected with each other in a lower area of the holder elements (4), and wherein the interior inserting device (6) is a predetermined distance from the exterior box-shaped frame (5) in the upper area of the holder element (4) and can be supported in a meander-shaped manner on the lateral surface (2''') of the case (2) of the compact discs (3) in the roof-shaped area (9); and wherein the interior U-shaped inserting (6) and the exterior box-shaped frame (5) are essentially embodied as one part, and a clamping shoe (6') for receiving a spring element (20) is provided in the upper area of the holding elements (4'); and wherein a guide (13') in the form of an angled profiled section is provided into which the holder elements (4') can be rotatably inserted by means of a holding tang (18).

6. The device in accordance with claim 5, wherein the bottom (10') of the holder element has a considerably wider extent in a direction of a longitudinal extent of the case (2) than the box-shaped frame (5) corresponding thereto.

7. The device in accordance with claim 6, wherein the holder element (4,4') is made of plastic.

8. The device in accordance with claim 6, wherein the holder element (4,4') is made of plastic.

* * * * *